Dr H. Bean.
Sawing Machine.

No. 116539

PATENTED JUL 4 1871

Witnesses:

Inventor:
Dr H Bean
Per
Attorneys.

UNITED STATES PATENT OFFICE.

HOMER BEAN, OF FREDONIA, ASSIGNOR TO HENRY M. WYETH, OF NEWARK, OHIO.

IMPROVEMENT IN SAWING-MACHINES.

Specification forming part of Letters Patent No. 116,539, dated July 4, 1871.

*To all whom it may concern:*

Be it known that I, DR. HOMER BEAN, of Fredonia, in the county of Licking and State of Ohio, have invented a new and Improved Sawing-Machine; and I do hereby declare the following to be a full, clear, and exact description of the same, reference being had to the accompanying drawing making a part of this specification, in which—

Figure 1:
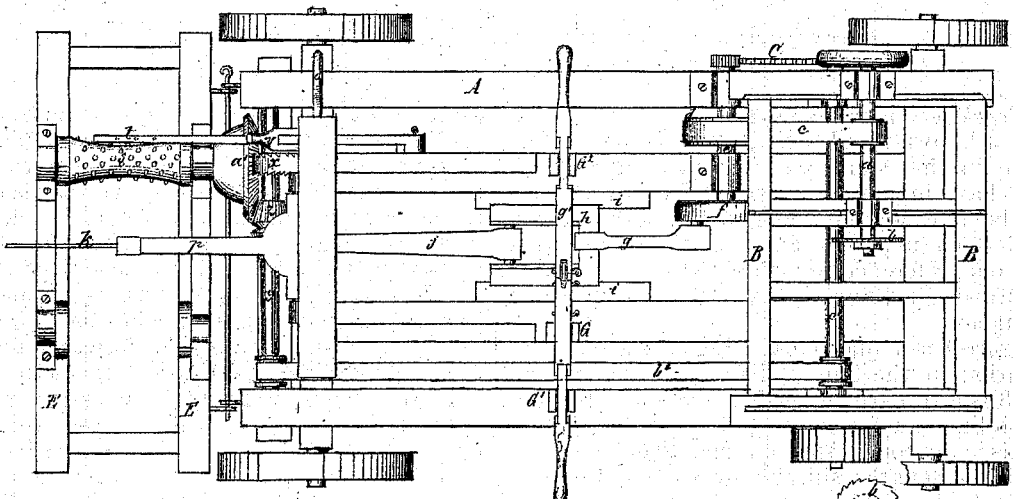
Figure 2:
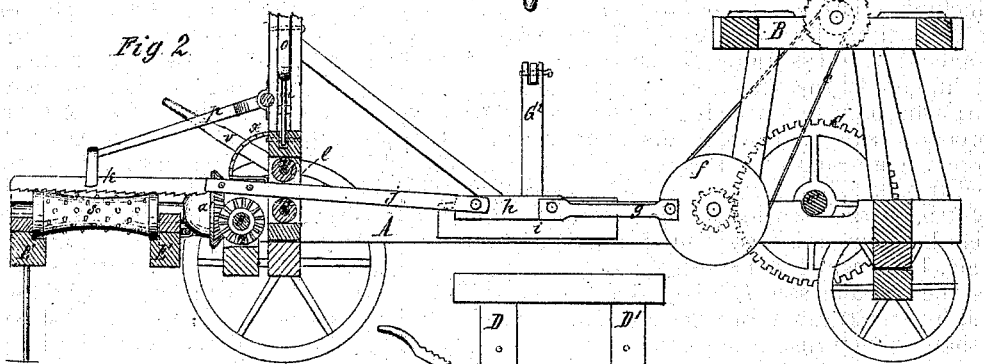
Figure 3:
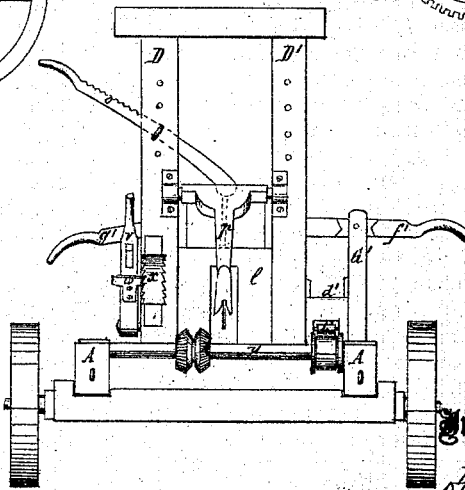

Figure 1 is a plan view. Fig. 2 is a sectional elevation in the line of the belt-tightener; and Fig. 3 is a transverse vertical section in front of the sliding saw-frame.

This invention relates to a machine for sawing wood into lengths suitable for stoves, furnaces, &c., including both a circular and a reciprocating saw; a portable frame bearing the operating mechanism; a cross-frame for sustaining the wood hinged to the front end of the portable frame; a mechanism for raising and lowering the reciprocating saw; and a mechanism for throwing into operation or out of it the feed-roller on the hinged frame.

Referring to the drawing, A is the main portable frame. Built upon the rear end of the frame A is a frame, B, on which is mounted a shaft, $a$, that bears the circular saw $b$. The shaft $a$ is connected by a belt, $c$, with a wheel, $d$, that is fixed on a shaft, $e$, mounted in the main frame A. The shaft $e$ is geared to the driving-wheel C. A wrist-pin that projects from a wheel, $f$, fixed on the shaft $e$, is connected, by a pitman, $g$, with a reciprocating frame, $h$, that slides in guides $i$ secured to the main frame A. To the frame $h$ is jointed the rear end of the bar $j$, to the front end of which the saw $k$ is secured. The saw-bar passes through a frame, $l$, between rollers $m$ mounted therein, said frame working on guides formed on the inner sides of vertical standards D D' that spring from the main frame A near the front end thereof. The frame $l$ is connected, by a rod, $n$, with a lever, $o$, that is pivoted to the standard D passing through a slot therein. By means of the lever $o$ and the connecting-rod the frame $l$ may be raised or lowered, and with it the saw $k$. A bar, $p$, jointed at its rear end to both standards D D', extends thence forward above the saw. To the front end of the bar $p$ a guide, $q$, is attached in a slot in which the saw $k$ works. By the means above described the saw $k$ is made to reciprocate so as to do its work, the circular saw $b$ being also driven at the same time, and the reciprocating saw is enabled to be placed in any desired position with reference to the wood to be sawn. E is the cross-frame that is hinged to the front end of the main frame, it being supported by a leg, $r$. Concave rollers $s$ are mounted crosswise of the frame E at each side of the saw $k$, said rollers being armed with teeth and serving both to sustain the log while sawing and to feed it for a fresh cut. The former office said feed-rollers discharge in conjunction with a holding-bar, $t$, whose rear end is jointed to the side of a brace, $u$, that is placed between the standard D and frame A. Said holding-bar is armed with teeth at its front end, which is directly above one of the feed-rollers $s$. The holding-bar $t$ passes through a slot in a lever, $v$, that is jointed to the standard D, so that by turning said lever forward the holding-bar may be moved downward far enough to clamp the log between itself and the feed-roller, and by turning the lever $v$ backward the holding-bar is raised and the log unclamped. The lever $v$ is provided with a tooth, $w$, projecting from one side, and by moving the lever sidewise far enough to cause the teeth $w$ to enter any one of the notches of a rack, $x$, that is affixed to the front side of the standard D, the holding-bar $t$ is thereby fastened. Their feeding function the rollers $s$ discharge in connection with a shaft, $y$, mounted crosswise of the frame A near the front end thereof, said shaft bearing a bevel-gear, $z$, that engages with a bevel-gear, $a'$, fixed on the inner end of one of the rollers $s$, and consequently imparts rotation to the latter. The shaft $y$ is connected, by a belt, $b'$, with the shaft $c'$ of the driving-wheel C. The belt $b'$ is loose on these two shafts and does not affect the rotation of the shaft $y$ unless tightened by means of a frame, $d'$, within which are placed rollers $e'$, between which one branch of the belt $b'$ passes, said frame $d'$ sliding vertically on guides formed on the inner sides of standards G G$^1$ that spring from the frame A. The frame $d'$ is connected by a rod with the lever $f'$, pivoted to the standard G$^1$, so that, by depressing the outer end of said lever, the frame $d'$ is raised, the belt $b'$ tightened, and motion consequently imparted to the shaft $y$ and to the feed-rollers $s$. A lever, $g'$, pivoted to a standard, G$^2$, that springs from the frame A is connected by a link with the inner end of the lever $f'$, for the purpose of enabling an additional operator to assist in tightening the belt, $b'$. After the log has been fed forward far enough the levers $f'\ g'$ are raised, the belt $b'$ loosened, and the feeding stopped.

Having thus described my invention, what I claim as new, and desire to secure by Letters Patent, is—

1. The saw-bar $j$, saw $k$, guide-bar $p\ q$, frame $l$, standards D D', and lever $o$, combined as specified.

2. The hinged cross-frame E provided with feed-rollers $s$ and a leg, $r$, and combined with the main frame A, as described.

3. The feed-rollers $s$, holding-bar $t$, lever $v$, and rack $x$, combined as set forth.

4. The feed-rollers $s$, shafts $y\ c'$, gears $a'\ z$, belt $b$, and the belt-tightener constructed of frame $d'$, rollers $e$, and levers $f'\ g'$, all constructed, arranged, and operating as described.

DR. HOMER BEAN.

Witnesses:
C. J. DICKINSON,
G. A. SHIELDS.